United States Patent [19]
Meeks

[11] Patent Number: 5,354,023
[45] Date of Patent: Oct. 11, 1994

[54] REFUSE CONTAINER CADDY APPARATUS

[76] Inventor: Lewis M. Meeks, Rte. 2, Box 164, Lexington, Miss. 39095

[21] Appl. No.: 19,679

[22] Filed: Feb. 19, 1993

[51] Int. Cl.⁵ .............................................. A47K 1/04
[52] U.S. Cl. .................................. 248/129; 248/907; 280/47.24
[58] Field of Search ............... 248/129, 907, 98; 280/47.24, 27.26, 47.29

[56] References Cited

U.S. PATENT DOCUMENTS

| | | | |
|---|---|---|---|
| 2,634,933 | 4/1953 | Grimsley | 248/129 |
| 2,650,786 | 9/1953 | Platt | 248/907 X |
| 2,745,676 | 5/1956 | Scott | 248/129 X |
| 2,930,561 | 3/1960 | Bittle | 248/125 X |
| 3,214,120 | 10/1965 | McKee | 248/907 X |

*Primary Examiner*—Ramon O. Ramirez
*Attorney, Agent, or Firm*—E. Michael Combs

[57] ABSTRACT

A refuse container includes a base flange, to include wheel members mounted thereto, with a hoop member positioned above the base flange, with the hoop member and base flange orthogonally oriented relative to a support plate. An upper distal end of the support plate includes a recess, with the recess pivotally receiving a positioning leg. The positioning leg arranged for projection through a container lid, with the positioning leg having a handle leg extending the positioning leg in an orthogonal relationship, and a grasp bar orthogonally mounted to the handle leg spaced from the positioning leg, with a spring mounting bar fixedly and orthogonally mounted to the handle leg spaced from the support plate, with spring members mounted to the spring mounting bar extending to the support plate, whereupon pivoting of the positioning leg within the recess lifts the associated container lid and maintains the lid in a raised orientation.

6 Claims, 4 Drawing Sheets

5,354,023

REFUSE CONTAINER CADDY APPARATUS

BACKGROUND OF THE INVENTION

1. Field of the Invention

The field of invention relates to container support apparatus, and more particularly pertains to a new and improved refuse container caddy apparatus wherein the same is arranged for the ease of transport of a refuse container, as well as the lifting and maintaining the lid in a raised orientation relative to the underlying container.

2. Description of the Prior Art

Container transport apparatus of various types have been utilized throughout the prior art for the support and movement of refuse containers and the like. Such apparatus is exemplified in the U.S. Pat. Nos. 4,362,309; 4,984,704; 4,821,903; and 5,040,808.

The instant invention attempts to overcome deficiencies of the prior art by providing for a transport container structure arranged for the ease and manipulation of a refuse container, as well as the lifting and maintaining in a raised orientation the container lid and in this respect, the present invention substantially fulfills this need.

SUMMARY OF THE INVENTION

In view of the foregoing disadvantages inherent in the known types of refuse container transport apparatus now present in the prior art, the present invention provides a refuse container caddy apparatus wherein the same is arranged for the support and ease of transport of a refuse container. As such, the general purpose of the present invention, which will be described subsequently in greater detail, is to provide a new and improved refuse container caddy apparatus which has all the advantages of the prior art refuse container apparatus and none of the disadvantages.

To attain this, the present invention provides a refuse container including a base flange, to include wheel members mounted thereto, with a hoop member positioned above the base flange, with the hoop member and base flange orthogonally oriented relative to a support plate. An upper distal end of the support plate includes a recess, with the recess pivotally receiving a positioning leg. The positioning leg arranged for projection through a container lid, with the positioning leg having a handle leg extending the positioning leg in an orthogonal relationship, and a grasp bar orthogonally mounted to the handle leg spaced from the positioning leg, with a spring mounting bar fixedly and orthogonally mounted to the handle leg spaced from the support plate, with spring members mounted to the spring mounting bar extending to the support plate, whereupon pivoting of the positioning leg within the recess lifts the associated container lid and maintains the lid in a raised orientation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved refuse container caddy apparatus which has all the advantages of the prior art refuse container apparatus and none of the disadvantages.

It is another object of the present invention to provide a new and improved refuse container caddy apparatus which may be easily and efficiently manufactured and marketed.

It is a further object of the present invention to provide a new and improved refuse container caddy apparatus which is of a durable and reliable construction.

An even further object of the present invention is to provide a new and improved refuse container caddy apparatus which is susceptible of a low cost of manufacture with regard to both materials and labor, and which accordingly is then susceptible of low prices of sale to the consuming public, thereby making such refuse container caddy apparatus economically available to the buying public.

Still yet another object of the present invention is to provide a new and improved refuse container caddy apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
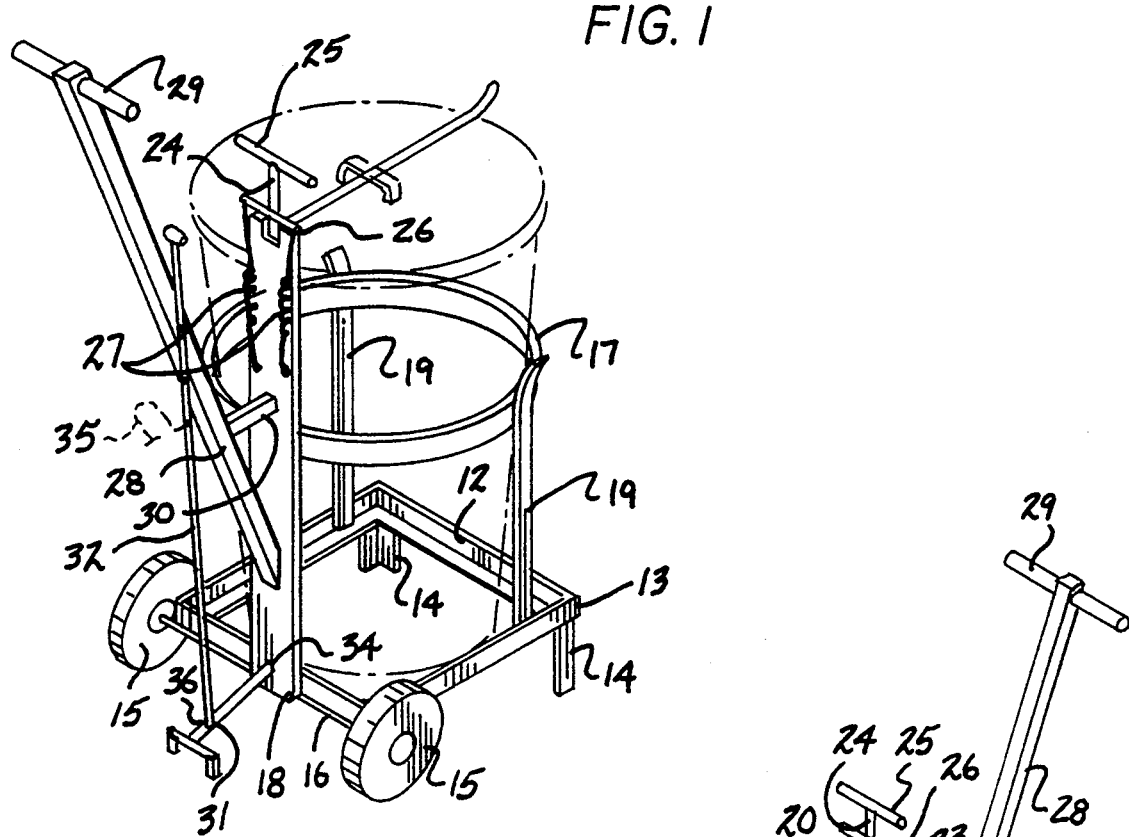
FIG. 1 is an isometric rear view of the invention.
Figure 2:
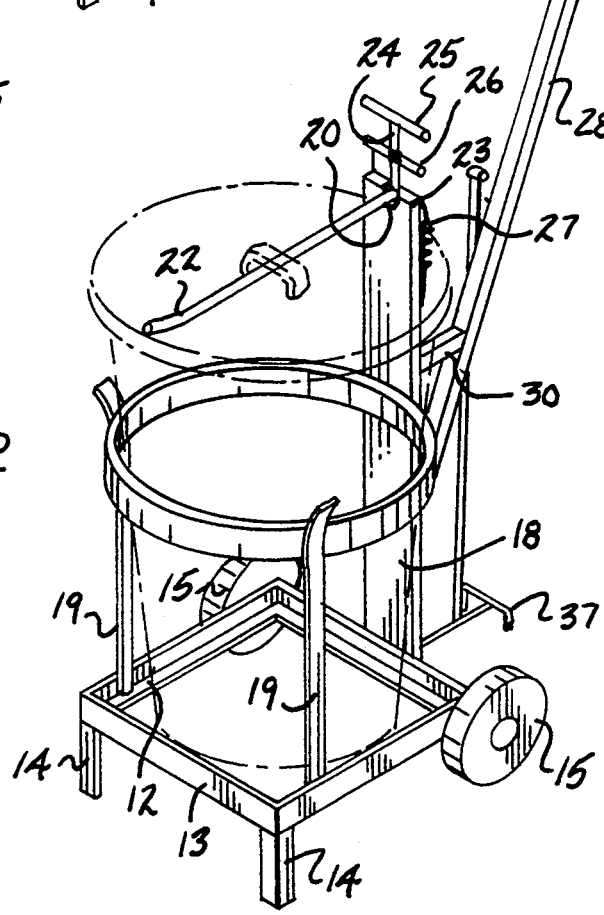
FIG. 2 is an isometric frontal view of the invention.
Figure 3:
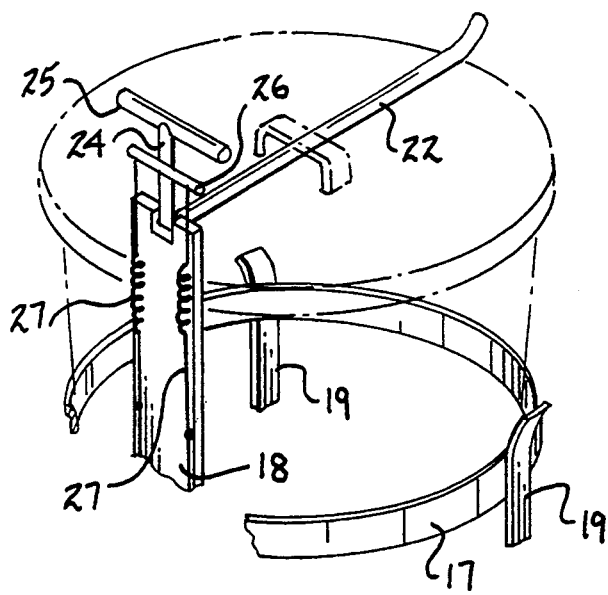
FIG. 3 is an isometric illustration, somewhat enlarged, of the positioning leg mounted relative to a container lid.

With reference now to the drawings, and in particular to FIGS. 1 to 9 thereof, a new and improved refuse container caddy apparatus embodying the principles and concepts of the present invention and generally designated by the reference numeral 10 will be described.

Figure 4:
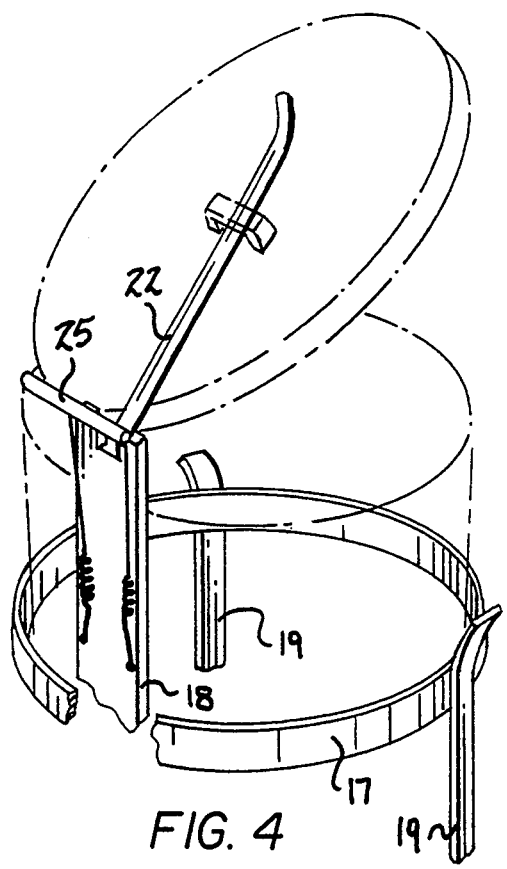
FIG. 4 is an isometric illustration of the invention indicating the container lid in a raised orientation relative to an under lying container.
Figure 5:
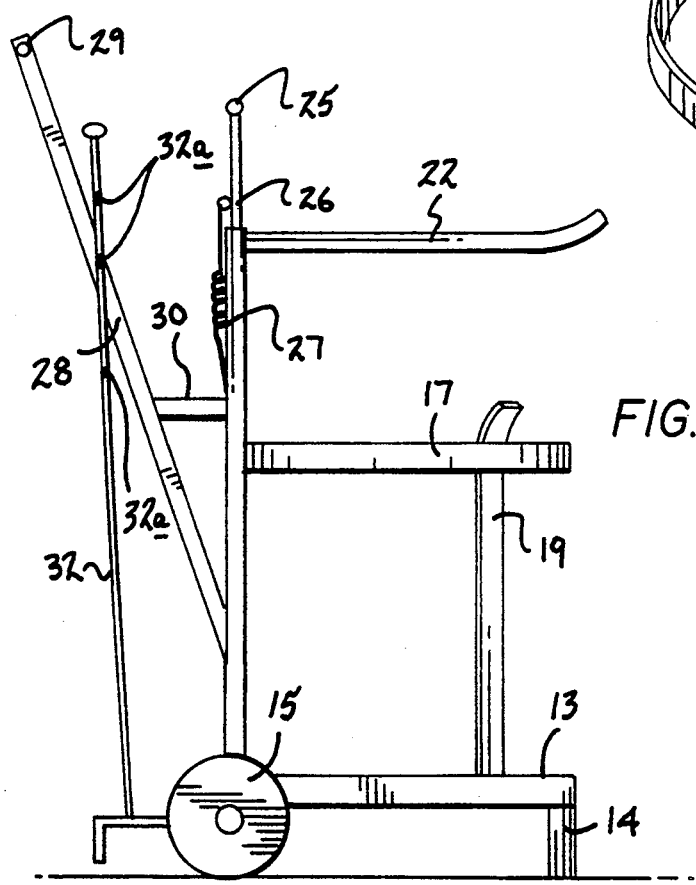
FIG. 5 is an orthographic side view of the invention.

More specifically, the refuse container caddy apparatus 10 of the instant invention essentially comprises the support, transport, and manipulation of a container 11 contained within the apparatus 10. A continuous base flange 12 is provided, including a base flange wall 13 extending about the base flange 12 to position and secure a lower end portion of the container 11 therewithin. Forward legs 14 are orthogonally mounted to the base flange 12 to extend therebelow, with parallel wheel members 15 rotatably mounted about a wheel axle 16. A support plate is orthogonally mounted in an integral relationship with the base flange 12 to extend thereabove, with a hoop member 17 fixedly and orthogonally mounted relative to the support plate 18 orienting the hoop member 17 in a spaced parallel relationship relative to the base flange 12. Hoop member support links 19 parallel relative to one another extend from the base flange to the hoop member 17 to provide for an integral securement and orientation of the hoop member relative to the base flange, in a manner as indicated in FIG. 1, with the hoop member support links 19 oriented substantially parallel relative to the support plate 18. The support plate top end 20 includes a top end recess 21, with a positioning leg 22 provided. The positioning leg 22 includes a first end spaced from a second end. The first end is arranged for projection through the lid handle of an associated container lid, with the positioning leg second end having a positioning leg axle 23 directed orthogonally therethrough orienting the positioning leg second end within the top end recess 21. A handle leg 24 is fixedly and orthogonally mounted to the positioning leg second end extending above the support plate top end 20. A grasp bar 25 is fixedly and orthogonally mounted to the handle leg 24 spaced from the positioning leg 22. A spring mounting bar 26 is orthogonally mounted to the handle leg 24 between the grasp bar and the positioning leg axle. A plurality of spring members 27 extend from the spring mounting bar 26 and are secured to the support plate 18. In this manner, the spring mounting bar 26 is arranged for substantial alignment with the support plate top end, whereupon pivoting of the positioning leg 22 about the positioning leg axle 23 by manipulation of the grasp bar 25, positions the spring mounting bar 26 in a spaced relationship relative to the support plate to thereby permit the spring members 27 to bias the spring mounting bar 26 downwardly to maintain the lid in a lifted orientation, in a manner as indicated in FIG. 4.

A cart handle link 28 is fixedly mounted to the support plate 18 between the hoop member 17 and the base flange 12. The cart handle link 28 thereby defines an acute angle between the positioning plate 18 and the cart handle link 28, with the cart handle link 28 terminating in a cart handle 29 to permit ease of manipulation of the caddy apparatus. A reinforcing link 30 is provided extending from the cart handle link 28 to the support plate 18 for integrally positioning and mounting the support plate relative to the handle link 28 thereby imparting geometric integrity to the organization in use.

Figure 6:
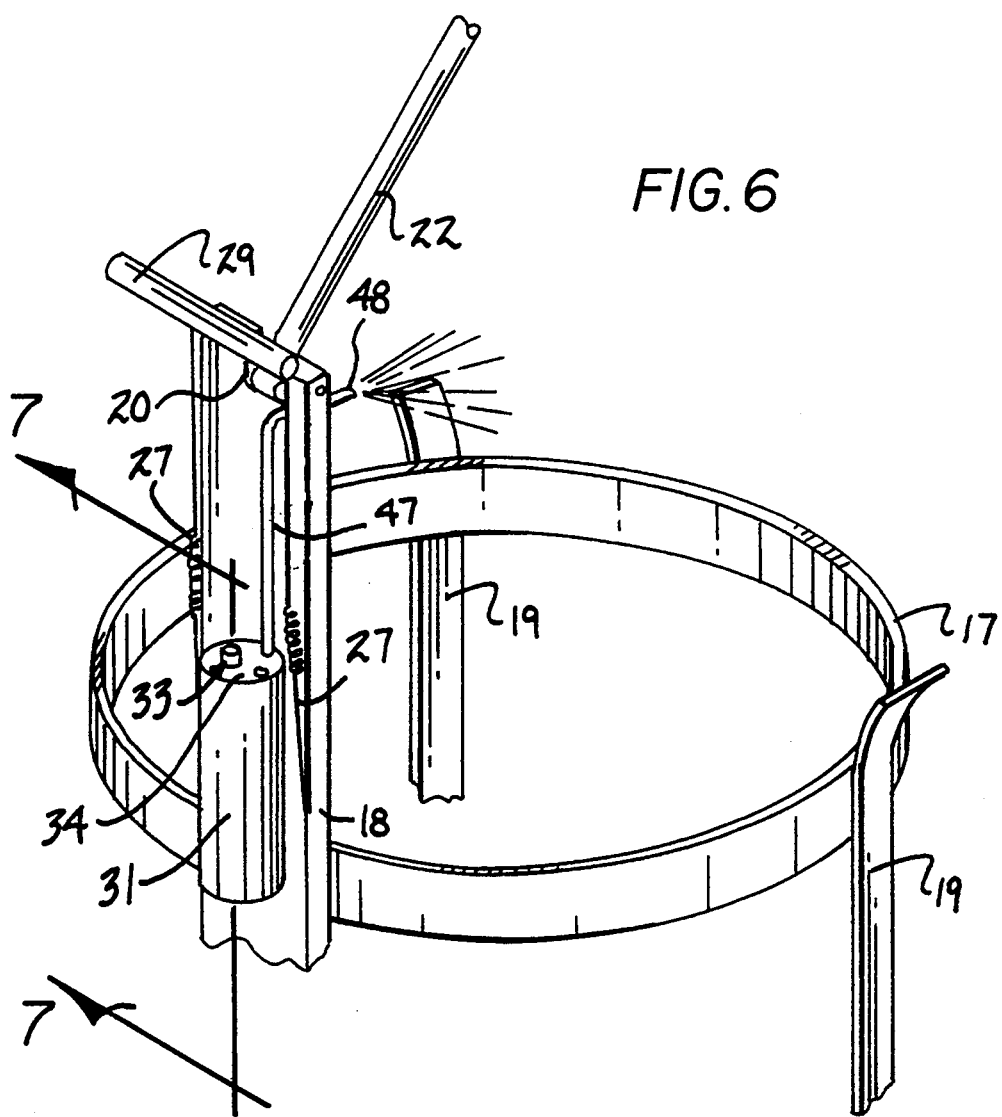
FIG. 6 is an isometric illustration of a modified aspect of the invention incorporating a deodorizing spray structure.
Figure 7:
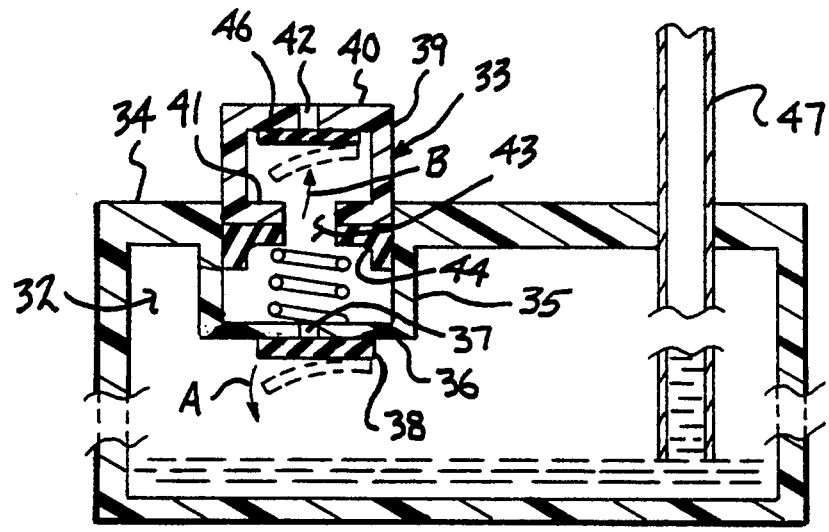
FIG. 7 is an orthographic view, taken along the lines 7—7 of FIG. 6 in the direction indicated by the arrows

FIGS. 6 and 7 indicate the mounting of a fluid reservoir 31 to the support plate 18. The fluid reservoir 31 includes a chamber 32, with a pump valve 33 mounted to the reservoir top wall 34. A valve chamber cylindrical side wall 35 is directed into the reservoir chamber 32 through the top wall 34, having a chamber floor 36, to include a floor opening 37. A first flexible flap seal 38 is mounted below the floor opening 37 that is displaced, in a manner as indicated in phantom line, when the plunger 39 is directed into the valve chamber directing the flap seal 38 in a displaced orientation relative to the chamber floor 36 permitting pressurizing of the reservoir chamber 32 and in that manner direct fluid into the fluid delivery tube 47 and through the delivery tube outlet opening 48 into the associated container 11 when the lid is lifted to thereby direct a deodorizer fluid from the reservoir chamber 32 into the container 11. The plunger 39, as indicated, includes a plunger top wall 40 spaced from a plunger bottom wall 41. The plunger top wall 40 includes a top wall aperture 42, and the plunger bottom wall includes a bottom wall aperture 43. A plunger seal 44 is mounted to the bottom wall, with a spring 45 interposed between the bottom wall and the chamber floor 36. A plunger seal 44 is mounted within the plunger 39 to the plunger top wall 40 to extend in sealing relationship over the top wall aperture 42 when the plunger is directed into the orientation of arrow "A", but wherein the second flexible flap seal 46 is displaced relative to the plunger top wall aperture to direct a recharge of air within the plunger when the plunger is raised to the direction of the arrow "B" by the spring 45.

Figure 8:
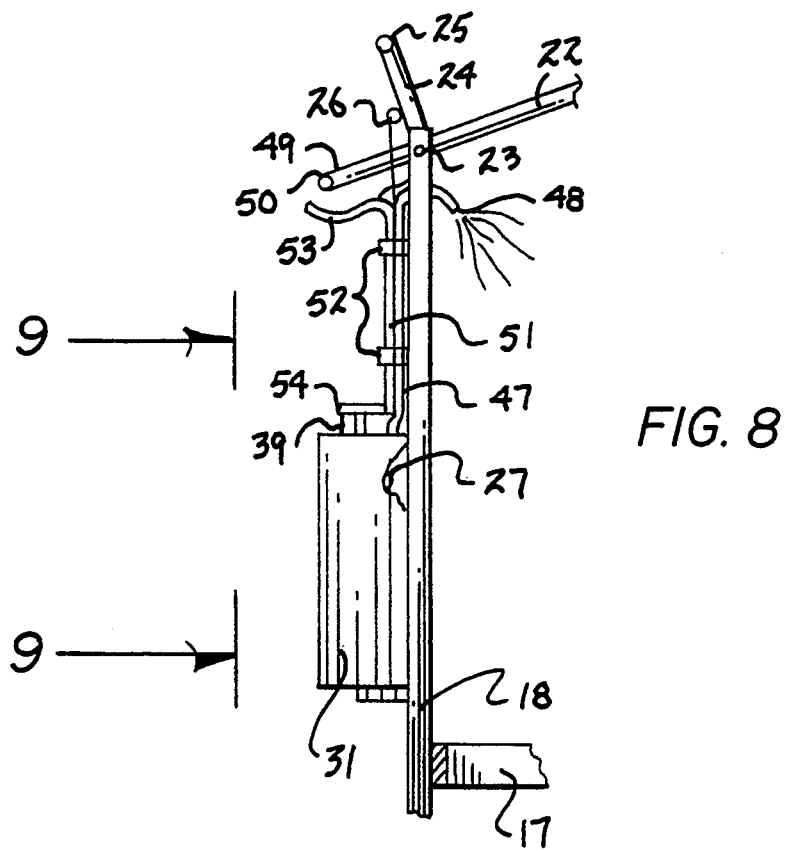
FIG. 8 is an orthographic side view of a modified refuse container incorporating automatic deodorant spraying.
Figure 9:
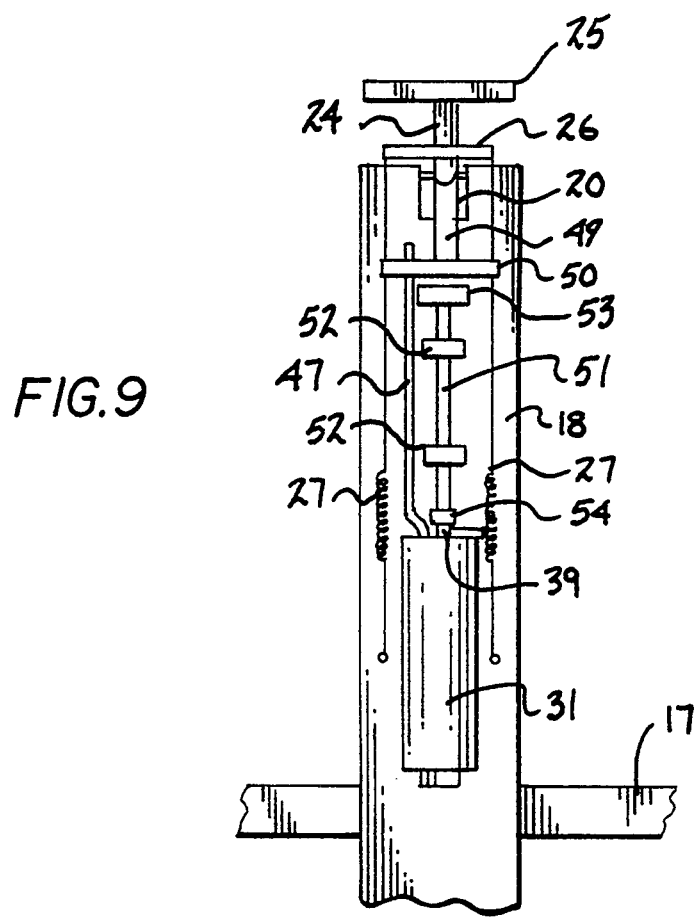
FIG. 9 is an orthographic view, taken along the lines 9—9 of FIG. 8 in the direction indicated by the arrows.

The FIGS. 8 and 9 indicate the use of a positioning leg extension 49 extending longitudinally aligned relative to the positioning leg 22 terminating in a leg extension handle 50. The leg extension handle 50 is arranged in adjacency relative to an arcuate actuator plate 53 mounted to an upper distal end of a plunger rod 51. The plunger rod 51 is slidably mounted within guide loops 52 in adjacency to the support plate 18. Upon pivoting of the positioning leg 22, the leg extension handle 50 engages the arcuate actuator plate 53 to thereby direct the plunger rod 51 towards the fluid reservoir 51, with a foot link 54 mounted to a lower distal end of the plunger rod 51 to thereby engage the plunger 39 to effect its depression and thereby project the fluid through the fluid delivery tube The FIGS. 1, 2, and 4 indicate the optional employment of a lock rod 32 having a series of rod apertures 32a (see FIG. 5), with the lock rod arranged to receive a lock pin 35, such as indicated in FIG. 1, through one of the apertures 32a for reception within a complementary bore through the link 28. A lowermost link 31 pivotally joined to the plate 18 about the support pivot 34 permits the link 31 pivotally mounted about the link pivot 36 to permit the rod 32 to project downwardly to direct the support feet 37 into engagement to an underlying surface to function as a parking brake preventing tipping of the structure during mounting and dismounting of the associated refuse container.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A refuse container caddy apparatus arranged for receiving a container therewithin, wherein the container includes a removable lid, and the apparatus comprises,
   a base member having a wall fixedly and orthogonally mounted to the base member extending in a surrounding relationship relative to the base member, with a plurality of wheel members mounted to the base member, and a plurality of spaced forward legs mounted to the base member spaced from the wheel members, and
   a support plate fixedly and orthogonally mounted to the base member, and
   a hoop member fixedly and orthogonally mounted to the support plate extending above the base member, where the hoop member is symmetrically oriented about a predetermined axis, and the axis is oriented medially of the base member, and
   the support plate having a support plate top end, the top end having a top end recess, and a positioning leg, the positioning leg including a leg axle directed through the support plate adjacent the top end projecting through the top end recess pivotally mounting the positioning leg within the top end recess, with the positioning leg having a first end secured to the lid, and having a second end positioned within the top end recess, and
   a handle leg fixedly and orthogonally mounted to the positioning leg at the positioning leg second end, and
   a grasp bar fixedly and orthogonally mounted the handle leg spaced from the positioning leg, and
   a spring mounting bar fixedly and orthogonally mounted to the handle leg spaced from the positioning leg axle, and
   the spring mounting bar including a plurality of spring members extending from the spring mounting bar and secured to the spring mounting bar and to the support plate below the top end recess.

2. An apparatus as set forth in claim 1 including a cart handle link fixedly mounted to the support plate between the top end recess and the base member defining an acute angle between the cart handle link and the support plate, and a cart handle mounted to the cart handle link.

3. An apparatus as set forth in claim 2 including a fluid reservoir mounted to the support plate, the fluid reservoir having a fluid reservoir chamber, with the fluid reservoir having a reservoir top wall, with a pump valve mounted to the top wall, and a fluid delivery tube in fluid communication with the fluid chamber extending through the support plate between the support plate recess and the base member, and the fluid delivery tube having an outlet opening directing fluid from the fluid reservoir to the container.

4. An apparatus as set forth in claim 3 wherein the pump valve includes a cylindrical side wall directed into the reservoir chamber, and a valve chamber floor having a valve chamber floor opening, a first flexible flap seal mounted to the valve chamber floor extending over the valve chamber floor opening, wherein the flap seal is arranged for displacement relative to the floor opening upon pressurizing the pump valve.

5. An apparatus as set forth in claim 4 including a plunger reciprocally mounted within the pump valve having a plunger top wall spaced from a plunger bottom wall, the plunger top wall having a top wall aperture, the bottom wall having a bottom wall aperture, wherein the plunger includes a further flap seal mounted within the plunger in communication to the plunger top wall extending over the top wall aperture, wherein the further flap seal is arranged for displacement relative to the top wall aperture upon projection of the plunger relative to the reservoir top wall, and a spring interposed between the plunger bottom wall and the valve chamber floor to bias the plunger in a displaced orientation relative to the valve chamber floor.

6. An apparatus as set forth in claim 5 including a plunger rod, guide loops mounted to the support plate, and a plunger rod slidably mounted within the guide loops, the plunger rod having a plunger rod arcuate actuator plate at a plunger rod first end, and the plunger rod having a plunger second end, including a foot link arranged for engagement with the plunger, and the positioning leg including a positioning leg extension, the positioning leg extension having a handle spaced beyond the support plate, wherein the positioning leg handle is arranged in adjacency relative to the arcuate actuator plate, whereupon pivoting of the positioning leg relative to the support plate effects engagement of the positioning leg handle with the arcuate actuator plate directing the foot link into engagement with the plunger.

* * * * *